United States Patent
Masuda

(10) Patent No.: US 6,931,025 B1
(45) Date of Patent: Aug. 16, 2005

(54) OPTICAL ADAPTATION LAYER FRAME FOR AGGREGATING IP FLOWS AT EDGE NODES FOR SONET TRANSPORT

(75) Inventor: Michio Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/516,147

(22) Filed: Mar. 1, 2000

(30) Foreign Application Priority Data

Mar. 2, 1999 (JP) .................................. 11-054400

(51) Int. Cl.[7] .............................. H04J 3/16; H04J 3/02
(52) U.S. Cl. ...................... 370/466; 370/469; 370/538
(58) Field of Search ................................ 370/907, 473, 370/474, 375.51, 401, 469, 395.1, 395.21, 370/395.43, 395.52, 476, 539, 466, 467, 370/395.5, 395.51, 395.6, 395.63, 411, 412, 370/465, 538; 398/49, 53, 76

(56) References Cited

U.S. PATENT DOCUMENTS 5,970,062 A * 10/1999 Bauchot .................. 370/310.2
6,148,001 A * 11/2000 Soirinsuo et al. ........ 370/395.4
6,236,660 B1 * 5/2001 Heuer ....................... 370/409
6,263,443 B1 * 7/2001 Anderson et al. ........... 713/201
6,385,201 B1 * 5/2002 Iwata ......................... 370/400
6,504,634 B1 * 1/2003 Chan et al. ................. 398/129
6,535,313 B1 * 3/2003 Fatehi et al. ............... 398/101
6,584,118 B1 * 6/2003 Russell et al. .............. 370/466

FOREIGN PATENT DOCUMENTS

| JP | 5-336159 A | 12/1993 |
| JP | 6-177912 A | 6/1994 |
| JP | 6-334680 | 12/1994 |
| JP | 10-93624 | 4/1998 |
| JP | 10-178428 A | 6/1998 |

OTHER PUBLICATIONS

M. Masuda et al., "A Proposal of Photonic Router Network", Electronic Information Comunications Society General Proceedings, (1999), pp. B-7-84.

* cited by examiner

Primary Examiner—Ricky Q. Ngo
Assistant Examiner—Soon D. Hyun
(74) Attorney, Agent, or Firm—Sughrue Mion, PLLC

(57) ABSTRACT

An optical network with an optical adaptation layer whose order is higher than synchronous optical network (SONET) layer and lower than Internet protocol (IP) layer is provided. The optical adaptation layer is configured to construct an optical adaptation frame into which IP flows are aggregated at an edge node.

7 Claims, 11 Drawing Sheets

OPTICAL ADAPTATION LAYER FRAME FOR AGGREGATING IP FLOWS AT EDGE NODES FOR SONET TRANSPORT

FIELD OF THE INVENTION

This invention relates to a delay guarantee system in a optical network, and more particularly to, a delay guarantee system to guarantee signal delay by providing a optical adaptation frame and by framing IP (Internet protocol) packets according to a quality of service (QOS) in optical network.

BACKGROUND OF THE INVENTION

Conventionally, the Internet offered a single QOS, i.e. only a best-effort type service that is equipped with a delay characteristic depending on the available bandwidth and instantaneous load. The control of QOS for each application is conducted by setting the network infrastructure properly. The concerned delay guarantee system by the Share Ride and timer can be estimated to satisfy the minimum bandwidth guarantee by only setting the standard frame length and time-out value suitably for each aggregated flow at each node, when handling only the best-effort data traffic, which occupies currently the majority of the Internet.

Referring to FIG. 1, the routing operation in optical network to supply only delay guarantee by the Share Ride and timer is explained. In a transmission network between an originating edge node (1b) and a destination edge node (1b), the delay is maximized when there occurs super frame construction waiting at all via core nodes (1c) located on the transmission path between the originating edge node (1b) and destination edge node (1b), and there occurs time out at all the nodes.

In this case, time delays of n×Td are accumulated between the originating edge node and destination edge node of optical network. Meanwhile, a n-stage connection and a time-out time of Td for super frame construction waiting are assumed, and the fixed delay in device is neglected.

Japanese patent application laid-open No. 6-334680 (1994) discloses a communication method where both of communication for audio, image signal etc. that needs the guarantee of band and non-band-guarantee type communication for data etc. that needs the utilization of band by the multiplexing guarantee can be handled by a single communication protocol, as well as handling communication with a limitation in fluctuation delay time and data communication with high burst characteristic. In detail, means for controlling the calling reception between communication nodes are provided and a connection at ATM layer is set. Here, the connection is end-to-end transmission path and corresponds to VC (virtual channel).

Japanese patent application laid-open No. 10-93624 (1998) discloses a packet transfer network where as a measure of convergence in network, not relative network queuing delay but absolute network queuing delay is used to provide an extension adaptive speed base convergence control system. In detail, to measure the sum of end-to-end transfer delay, test sample traffic is defined and the dynamic control of transmission speed is conducted.

However, in Japanese patent application laid-open No. 6-334680, to give the connection newly, known software processing by signaling protocol is available. However, the temporal overhead of this software processing is significantly longer than the time for packet transmission.

Also, when conducting the dynamic control of transmission speed by the algorithm in Japanese patent application laid-open No. 10-93624, the scale of hardware increases. Namely, to calculate the minimum cell speed, round-trip time, the time-out maximum value of various timers, lowest-speed link capacity etc., it is necessary to dispose a message exchanging means to communicate the condition of load between nodes and a timer with good accuracy at each node.

Further, since a real time service such as audio traffic is characterized by a low packet delay variation and a very low packet loss, the delay guarantee at network level cannot be obtained by only the method above-mentioned.

SUMMARY OF THE INVENTION

Accordingly, it is an object of the invention to provide a optical network that is equipped with a delay guarantee system to guarantee signal delay.

According to the invention, a optical network, comprises:
  a optical adaptation layer whose order is higher than synchronous optical network (SONET) layer and lower than Internet protocol (IP) layer;
  wherein the optical adaptation layer constructs a optical adaptation frame into which IP flows are aggregated at an edge node.

In this invention, in transfer network where layer 3 packet datagram transfer is conducted, an adaptation frame where multiple layer 3 packet data are merged as a transfer container more than a given length is provided to get the statistical multiplexing effect, the segregation of service is conducted at each node on the transfer route, thereby the delay guarantee at network level can be realized. For example, it is provided in a large-scale network connected in multistage such as a core network operated by network operator (carrier), even when an end-to-end accumulated delay is expected in packet exchange network or accumulation exchange type device where a transmission-line delay or in-device delay is accumulated at each via device, the aggregated flow and delay guarantee are correlated to enable the delay guarantee.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
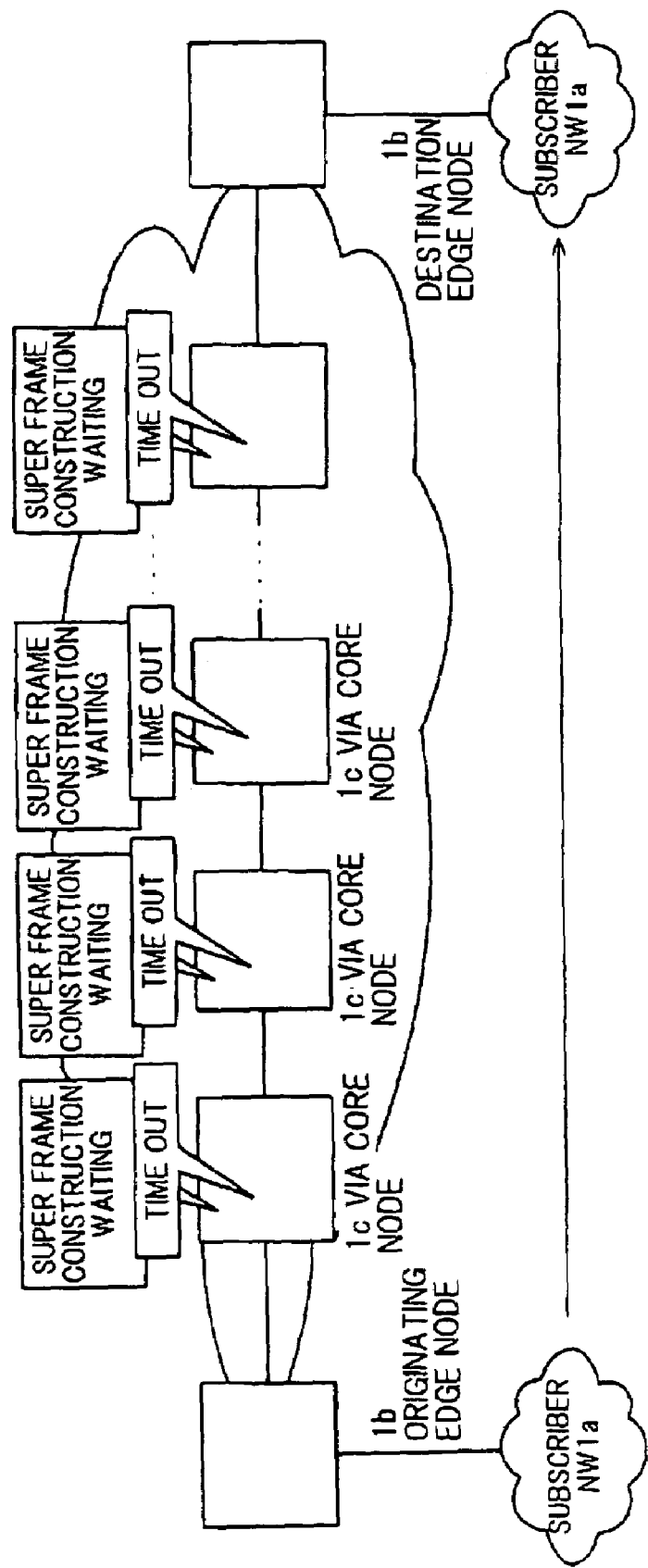
FIG. 1 is an illustration showing the conventional process of encapsulating into optical adaptation frame.

The preferred embodiments of the invention will be explained below, referring to the drawings.

Figure 2:
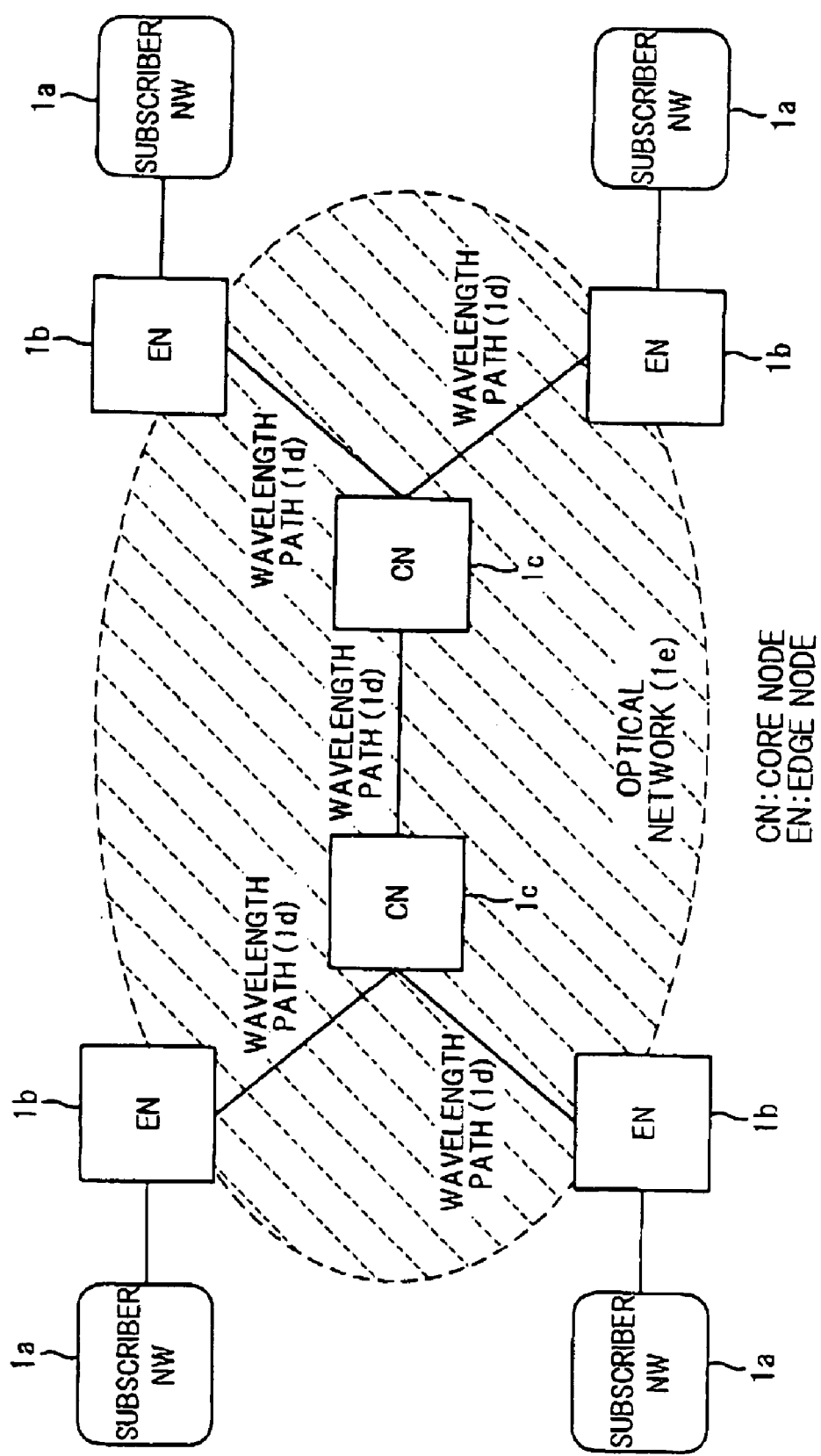
FIG. 2 is an illustration showing a optical network according to the invention.

FIG. 2 is a block diagram showing a optical network to which the invention is applied. As shown in FIG. 2, the optical network 1*e* is connected to. e.g., a subscriber network 1*a* which is an existing network, and includes an edge node 1*b* that contains IP packet from a subscriber network 1*a* to the optical adaptation frame, and a core node 1*c* that conducts in-network relay transfer processing by unit of optical adaptation frame.

The optical network 1*e* is constructed by optical nodes 1*b* connected by wavelength paths 1*d*.

A wavelength path 1*d* is a virtual path (VP) that fixedly connects between adjacent repeaters, i.e. core nodes, in the optical network, and it corresponds to a hop by hop path. The VP is in advance fixedly laid by network operator, not by software processing such as signaling protocol, and it is not laid every time a new packet is transferred.

The optical node includes a pluralistic subscriber network 1*a*, such as IP (Internet protocol). SDH (synchronous digital hierarchy) and ATM (asynchronous transfer mode), to be layer-defined by OSI (open system interface) reference model.

The optical node functions as a optical edge node 1*b* to conduct the protocol terminating processing of layer 1 as a physical layer, layer 2 as a data link layer and layer 3 as a calling-control/additional-function layer, and also functions as an in-network device of optical network.

Connections between optical edge nodes 1*b*, between optical core nodes 1*c*, and between optical edge node 1*b* and optical core node 1*c*, respectively, are given by wavelength path 1*d*.

The optical network 1*e* may be also constructed by wavelength path of optical cross connect (OXC), optical ADM (add/drop multiplexer) device etc. in the existing WDM (wavelength division multiplexing) network. Also, the installation cost can be reduced depending on the alignment with the existing infrastructure.

According to Moore's rule, the performance of newly developed chip is twice that of previously brand-new chip, and it is said that the pace is 19 to 24 months. If this tendency continues, the processing performance of computer increases in exponential growth for a relatively short period. The switching performance (packet per second, PPS) also increases in proportion to Moore's rule. Also, along with the popularization of the Internet, the traffic capacity of network is rising at a surprising speed over Moore's rule (at an annual rate of 1000 percents), and it is expected to continue.

As the method of filling the gap above, to elongate the packet length as transmission unit is effective. This is because (switching performance (PPS))×(average packet length)=(network transfer capacity) is established.

Also, by elongating the packet length, a large-capacity switch can be at low cost even by the present technology. For example, in case of input buffer type switch, when the transfer unit changes from 53 bytes into several hundreds bytes of ATM cells, the switch determination processing can be simplified by that much. Therefore, in general, a larger switch size can be provided by the present technology.

However, when elongating the packet length, it is necessary to alter the middle ware (transmission control protocol, TCP/IP). So, itis difficult to popularize. Thus, in this invention, a optical adaptation frame matched to in-network transmission is introduced at each node of network.

Figure 3:
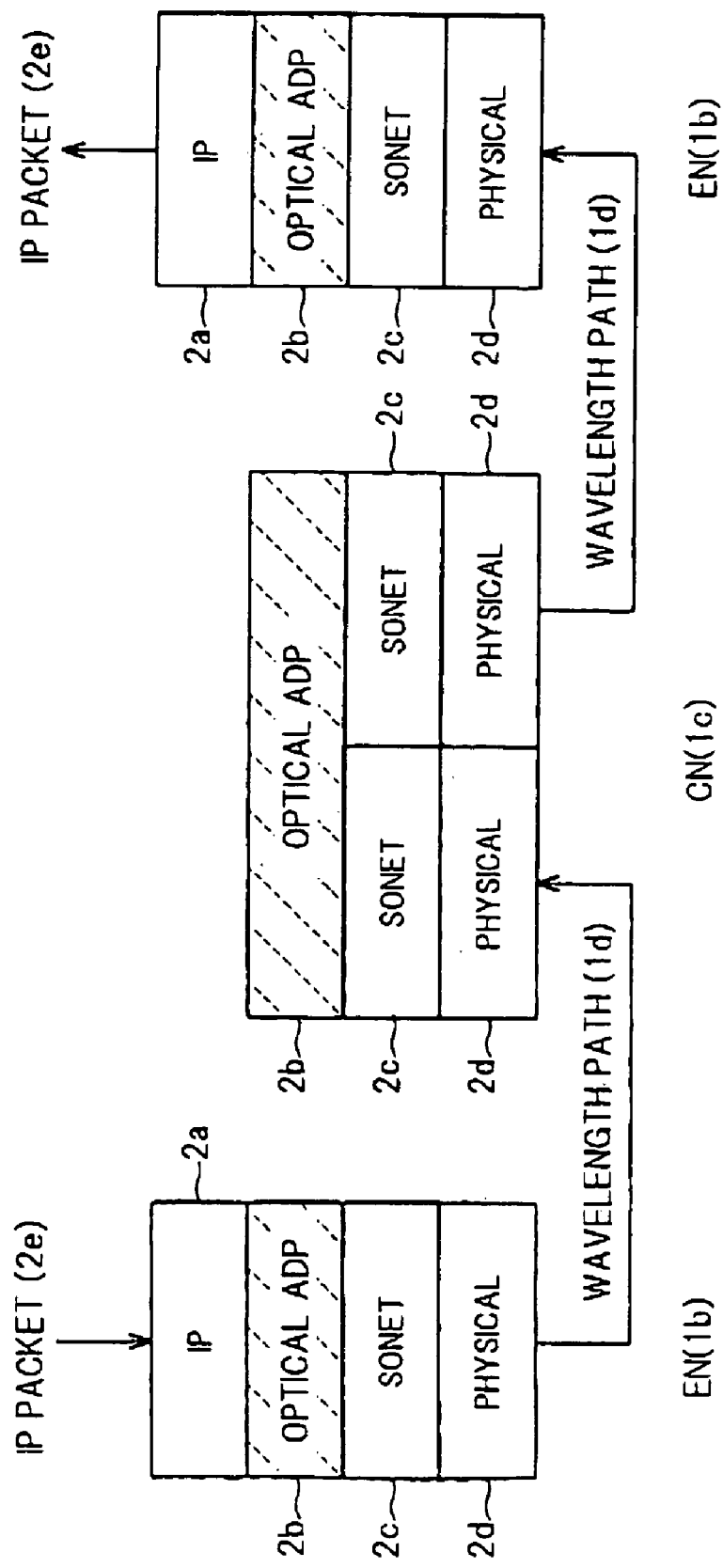
FIG. 3 is an illustration showing the protocol stack at core node and edge node.

FIG. 3 shows the protocol stack at each node (edge node 1*b*, core node 1*c*) located in optical network. As shown in FIG. 3, at each node, optical adaptation (optical ADP) layer 2*b* as an intermediate layer is laid between IP layer 2*a* as layer 3 and SONET (synchronous optical network) layer 2*c* as layer 2. Optical edge node EN terminates IP packet 2*e* from subscriber network 1*a*, grouping the separate IP packet 2*e* at optical ADP layer 2*b*, constructing the optical adaptation frame. In constructing the optical adaptation frame, the QOS processing or transfer determination processing in the network can be simplified by aggregating into destination network node (egress node to exit from the network to the destination user network) and QOS (for delay-oriented and best-effort).

The number of IP flows that are being transferred on a high-speed channel with a standard of STM4 or OC12 in 600 Mbit/sec class comes to one million per second, and a frequency at which individual flow is born or dead is very unstable. However, when considering it by unit into which the respective flows are aggregated, it is known that it takes a very long time. Here, "flow" means a group of packets to be transferred in network or sub-network, and every flow is to have guaranteed QOS (quality of service). The flow may be composed of packets from single application session, or may be an aggregation that includes data traffics from multiple application sessions. Especially in optical network, the latter is called aggregated flow. Also, a flow identifier assigned to optical adaptation frame is used to uniquely identify a packet as belonging to the flow. As examples of the flow identifier, virtual channel (VC) in ATM, flow label in IP ver. 6, and a pair of IP address protocol port at sender and IP address protocol port at destination in IP ver. 4 are included.

Differentiated service (DS) done by a carrier is to offer a differentiation in network transmission to each flow depending on QOS such as type of contract, traffic, application etc. The type of application means a difference among e-mail, facsimile and so on, or in lower-order layer a difference among TCP (transmission control protocol, which is a protocol of transport layer in network), UDP (user datagram protocol, which is a protocol of transport layer without guaranteed reliability) and so on. Therefore, each of via nodes needs processing to supervise and control a flow of several millions to tens of millions per link and to guarantee the network QOS. However, in a large-scale trunk network, since the number of nodes to be transited increases, the throughput may lower when the above processing is conducted at each node transited.

In contrast with this, this invention is equipped with means for mapping each IP flow to an aggregated flow label to aggregate each destination router address or network QOS defined in the optical network at an edge node which has a slower interface than a core node located in the network and rules directly a subscriber network. It constructs a optical ADP frame (3*a*) to which each IP packet is aggregated and which is handled as a transfer unit in the optical network (1*e*).

Figure 4:
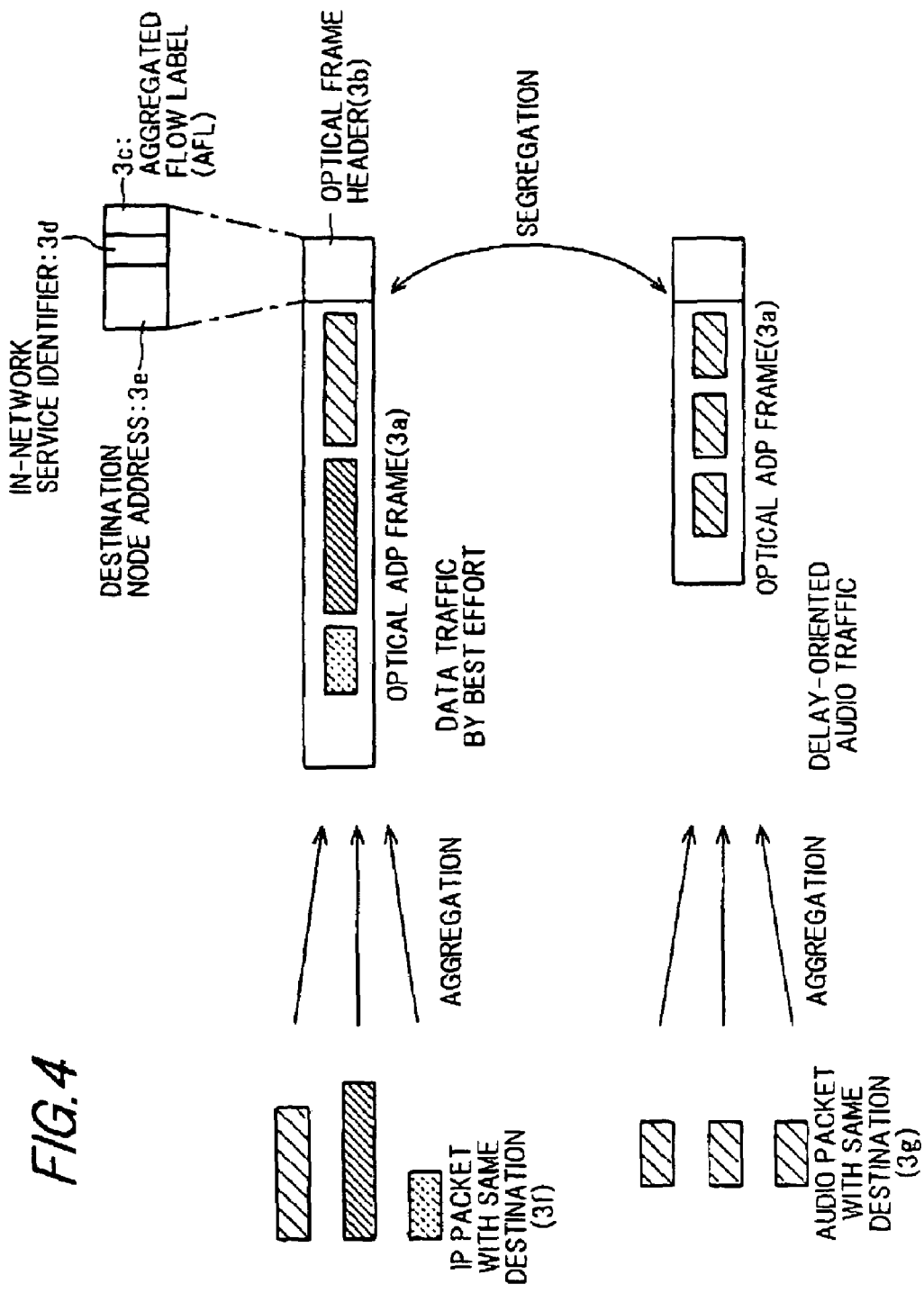
FIG. 4 is an illustration showing a construction model of optical adaptation frame.

FIG. 4 is a conceptual diagram showing a compositional example of optical frame in optical ADP layer. As shown in FIG. 4, at an edge node of optical network, IP packets 3*f* directed to a same destination are grouped, and a optical ADP frame 3*a* to which the respective packets are aggregated is constructed. Audio packets 3g directed to a same path are aggregated to another optical ADP frame 3a which is segregated from the above-mentioned optical ADP frame 3a to which data traffics are aggregated mainly.

As shown in FIG. 4, the optical edge node is equipped with means for supervising respective IP flows at the subscriber side and mapping them to the aggregated flow label to aggregate each destination optical router address defined in the optical network. Owing to this means, the optical node only has to supervise an aggregated flow defined in the optical network, and to make a control according to a priority. So, even for a very fast interface, the flow management and priority control can be performed simply.

Thus, the aggregation of packet flow and segregation of service according to packet flow from subscriber network are limited to the edge node of optical network. For the transmission in optical network, the supervision of flow by unit of IP packet is unnecessary. Therefore, the throughput of the entire network can be significantly enhanced as compared with to handle IP flow directly.

As shown in FIG. 4, a optical adaptation frame header 3b is intended to include destination node address 3e, aggregated flow label (AFL) 3c and in-network service identifier 3d. Any in-network frame that can include the node address 3e, AFL 3c and in-network service identifier 3d as information may be used whichever frame system it belongs to. The field length needed is determined according to the scale of network to contain and the number of service classes to be supported.

The optical adaptation frame is defined a frame length greater than a certain length. The reference frame length can be multiple frame lengths, depending on the number of service classes to be supported in the network.

A long packet greater than a certain length is handled as single optical adaptation frame, transferred into optical network. On the other hand, multiple short packets with some tens of bytes or hundreds of bytes are transferred being assembled into one optical adaptation frame. Herein, a optical adaptation frame greater than a certain length is called super frame.

Depending on the ratio between the sum of multiple IP packets included in a super frame and the length of the super frame, the usage rate of link may lower. For example, if a some kilos of byte super frame is constructed to the unit of some tens of byte single IP packet, the usage rate of link in optical network to transmit the super frame becomes low, so that the network band cannot be used efficiently. Therefore, the super frame is not transferred from the optical edge node 1b to the optical network until the sum of IP packets to occupy the payload in the super frame is greater than a certain length.

When the traffic to aggregated flow is very low, there occurs a problem that, at optical edge node 1b, IP packets are slow to aggregate to a super frame. In each node located in the network, when a super frame is being constructed in a memory to aggregated flow and the traffic of aggregated flow to follow is light after storing the first IP packet into the super frame, it is estimated that it takes a very long time until the super frame is completed and then is transferred to the optical network.

As the way of making the usage rate of payload in super frame more than a certain value, optical via core nodes allow packets to co-ride. This system is called share ride. A share ride is an omnibus used to transport passengers to a common terminal in North America.

The super frame is a frame defined in regard to aggregated flow or in-network service identifier. For example, introduced is a method that multiple IP packets can share a super frame as transfer container, by unit of same destination, same aggregated flow label, same in-network service identifier. By containing IP packets as many as possible into the super frame, the usage rate of the super frame can be enhanced.

Figure 5:
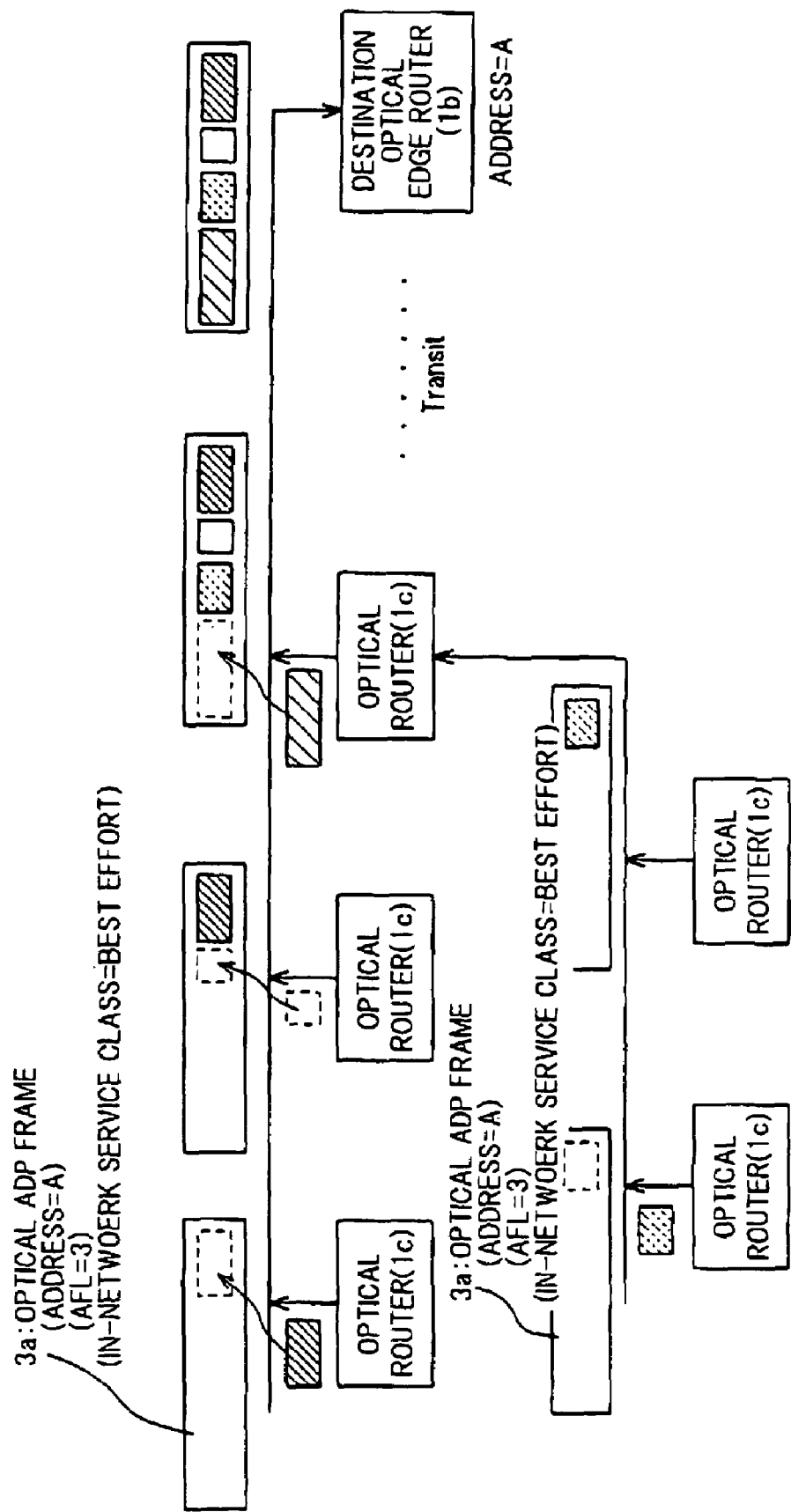
FIG. 5 is an illustration showing share-ride transfer operations among via optical routers.

FIG. 5 is an illustration showing an example of operation of share ride. In FIG. 5, shown is an example that multiple super frames with low packet containing efficiency are merged on a optical node located on the transfer route of optical network and are transferred reconstructing into a new super frame. By unit of same destination node, same aggregated flow label and same in-network service class, multiple IP packets or super frames less than a given length are merged efficiently and encapsulated again into a super frame greater than the given length. Thus, the usage rate of link (wavelength path) in optical network can be enhanced.

In case of very low traffic to aggregated flow, when share ride above-mentioned is introduced, there may occur a case that IP packet already inserted to a super frame must wait at optical node on the transfer route for a long time. To prevent this, time-over is defined to a time to stay in memory when constructing the super frame of optical. So, a super frame that is staying longer than a certain time is transferred to the optical network even when IP packets of more than a given number are not inserted thereto.

After a node where the super frame of more than a given length is constructed, a transit transfer that no reconstruction of super frame is conducted at via nodes can be taken as the transfer form of optical network.

On the contrary, in order to enhance the throughput of the entire network, a way enabling to complete the construction of super frame as soon as possible is needed in addition to the transfer method described above.

Two delay guarantee systems in preferred embodiments according to the invention are explained below.

In the first preferred embodiment the header of an aggregated flow optical adaptation frame is provided with a field called time output limit, which designates the number of nodes devoted to the share ride waiting. Also, in the second preferred embodiment, an extension optical header is provided to designate a node devoted to share ride waiting. These embodiments are detailed below.

First Embodiment

Figure 6:
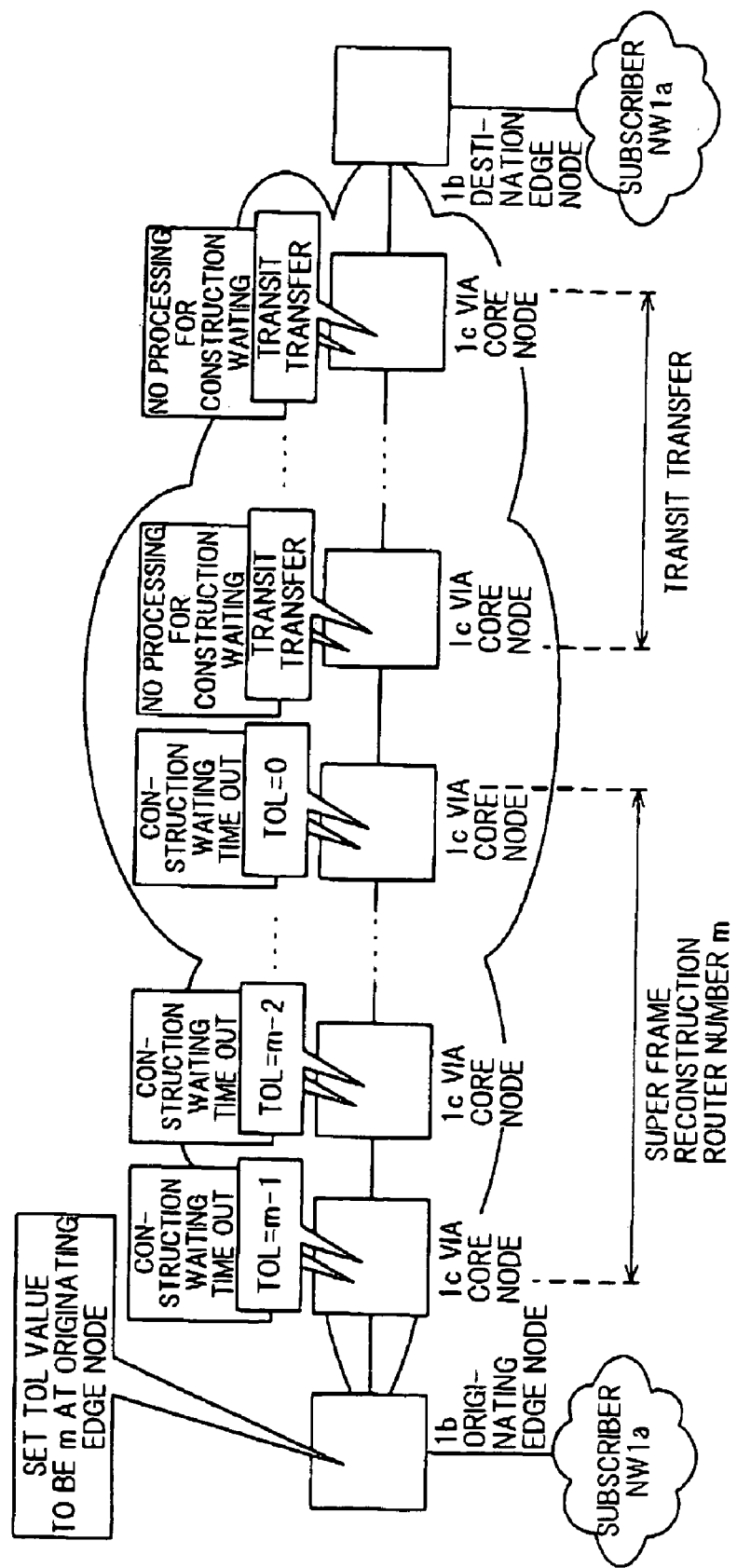
FIG. 6 is an illustration showing the transfer mechanism of a optical network model in a first preferred embodiment according to the invention.

FIG. 6 is a block diagram showing a optical network in the first preferred embodiment according to the invention. It is characterized in that the header of an aggregated flow optical adaptation frame is provided with a time output limit field (TOL field). Here. TOL field value is set to be m at originating edge node. m is the number of nodes devoted to the share ride waiting, and may be set by the network operator.

In operation, at the originating edge node 1b, a optical adaptation frame that designates the number of nodes, of via core nodes, devoted to the share ride waiting as the reconstruction processing of super frame is constructed, and transferred to the optical network. Also, at a node, of via core nodes 1c located on the transfer route, where the processing of share ride waiting results in time out because the super frame more than a given length cannot be built up within a given wait time, the TOL field value is decremented, and then the frame is transferred to the next-stage via node. After via core node where the TOL field value is detected zero, the share ride waiting is not conducted even when the super frame is shorter than a given length, and the frame is transit-transferred.

Thus, by defining m nodes, of n via core nodes between the originating edge node 1b and the destination edge node 1b, devoted to the share ride waiting, the accumulated delay time can be reduced to (m/n)*Td (Td: a time-out time for super frame construction waiting in FIG. 1).

Second Embodiment

Figure 7:
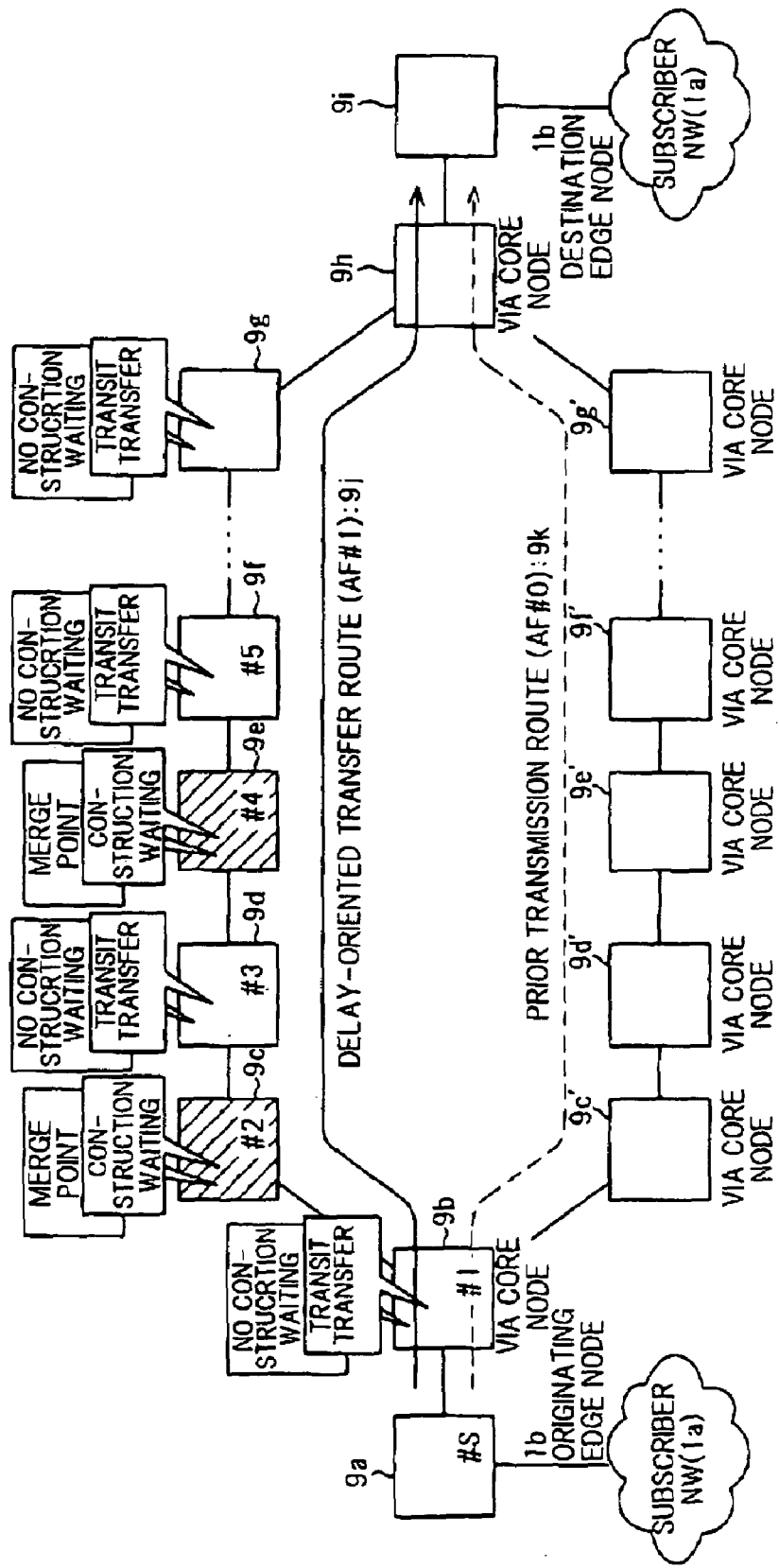
FIG. 7 is an illustration showing the transfer mechanism of a optical network model in a second preferred embodiment according to the invention.

FIG. 7 is a block diagram showing a optical network in the second preferred embodiment according to the invention. In FIG. 7, the originating edge node #S (9a) includes a subscriber network 1a, and forms separate IP packets received from the subscriber network 1a into a optical ADP frame 3a by optical adaptation layer 2b, then sending it to the optical network 1a.

Via core nodes 9b', 9c', 9d'. 9e', 9f and 9h' are optical core nodes existing on the optical network from the originating edge node to the destination edge node.

9k is an ordinary transfer route from the originating edge node 9a to the destination edge node 9i, and AF#0 as aggregated flow is assigned to the route. Also, on the transfer route with AF#0, best-effort class optical adaptation frames are transmitted. The via core nodes 9b', 9c', 9d', 9e', 9f and 9h' detect an address of optical node to be next transferred from the header of a optical adaptation frame received, routing to the via core node next transferred according to the destination node address.

9j is a delay-oriented transfer route from the originating edge node 9a to the destination edge node 9i, and AF#1 as aggregated flow is assigned to the route. On the transfer route with AF#1, delay-oriented class packets are transmitted.

Figure 8:
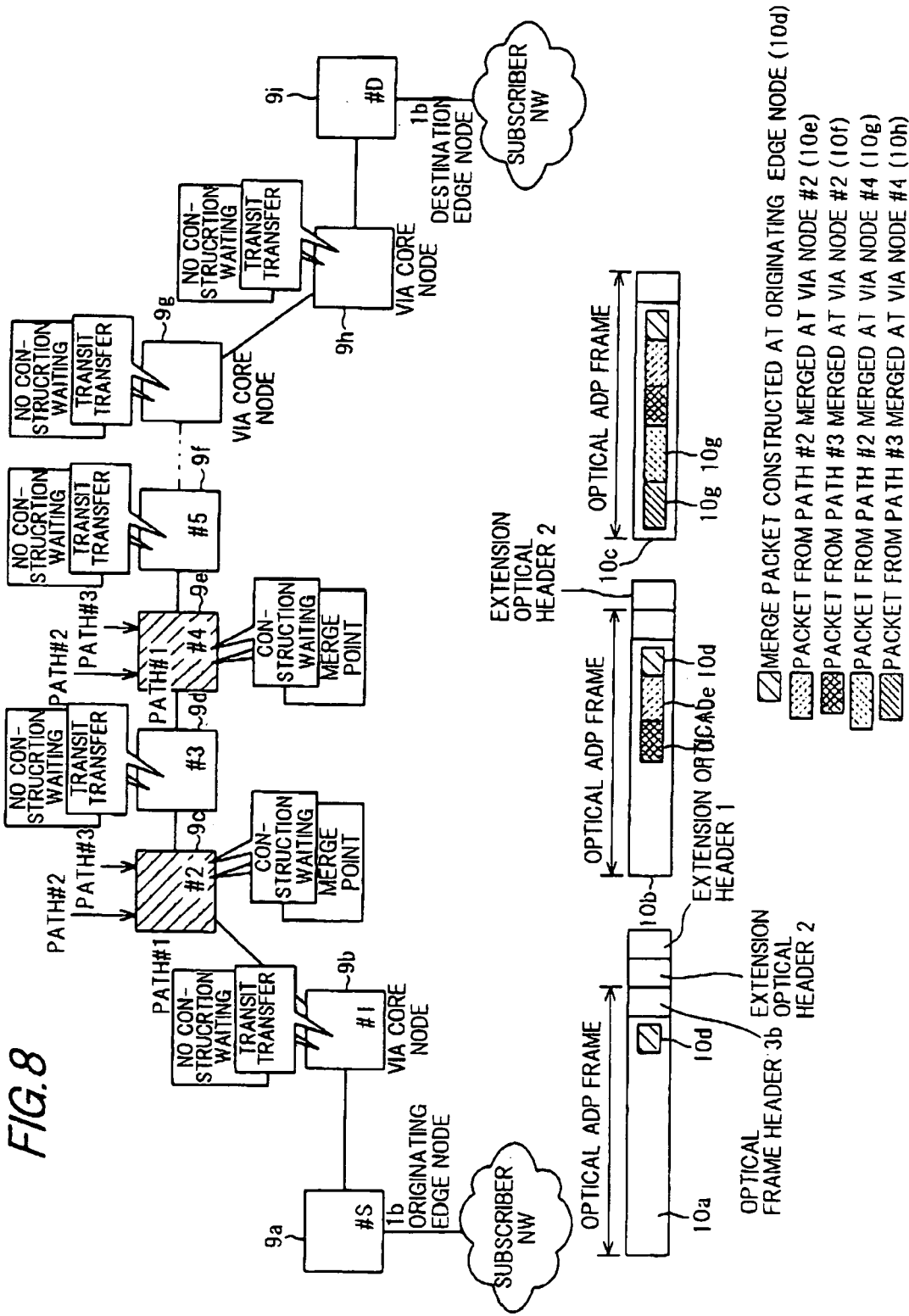
FIG. 8 is an illustration showing an example of optical adaptation frame transmitted from an originating edge node and its transfer operation according to the invention.

FIG. 8 shows an example of optical adaptation frame transferred from the sender edge node and its transfer operation. In FIG. 8, a optical adaptation frame 10a containing packets to be delay-guaranteed from the sender edge node #S (9a) is composed of extension optical header 1 (1001) and extension optical header 2 (1002) which have via nodes designated as destination address, optical header 3b which has the address of actual destination edge node, and a optical frame payload 3a. The actual optical frame is located after the extension optical headers, and the extension optical header 1 (1001) including the address of via node to go through at first is located on the top of the optical frame and the extension optical header 2 (1001) including the address of via node to go through secondly is located next. The extension headers pretend as a pseudo-optical header in place of the actual optical header 3b until a core node designated by the address of node assigned to each of them.

Also, by designating sequentially via core nodes with a big packet share-ride effect by the leading of the originating edge node, the frame can be transit-transferred without waiting the reconstruction of super frame until the designated via node.

The originating edge node 9a determines the addresses of optical via core nodes 9c, 9e based on the address of the destination edge node 9i, placing them into a given field of the extension optical header. Also, it determines a service class up to the via node, placing it into a given field of the extension optical header. The in-network service class may designate a flag (identifier) to indicate that no share ride waiting is conducted, and may be provided with a TOL field described in the first embodiment.

FIG. 8 also indicates that the usage rate of payload in optical adaptation frame is enhanced by the share ride effect. At core node #2 (9c) designated to go through at first, the extension optical header 1 is removed and packets 10a, 10f having same AF and same in-network service class are merged with the optical adaptation (ADP) frame 3a. Similarly, at core node #4 (9e) designated to go through secondly, the extension optical header 2 is removed and packets 10g, 10h having same AF and same in-network service class are merged with the optical ADP frame 3a.

Thus, by the removal of the extension header and the merging of packet from the other route at the via nodes 9c, 9e designated, the usage rate of payload of the optical adaptation frame 3a can be enhanced.

Figure 9:
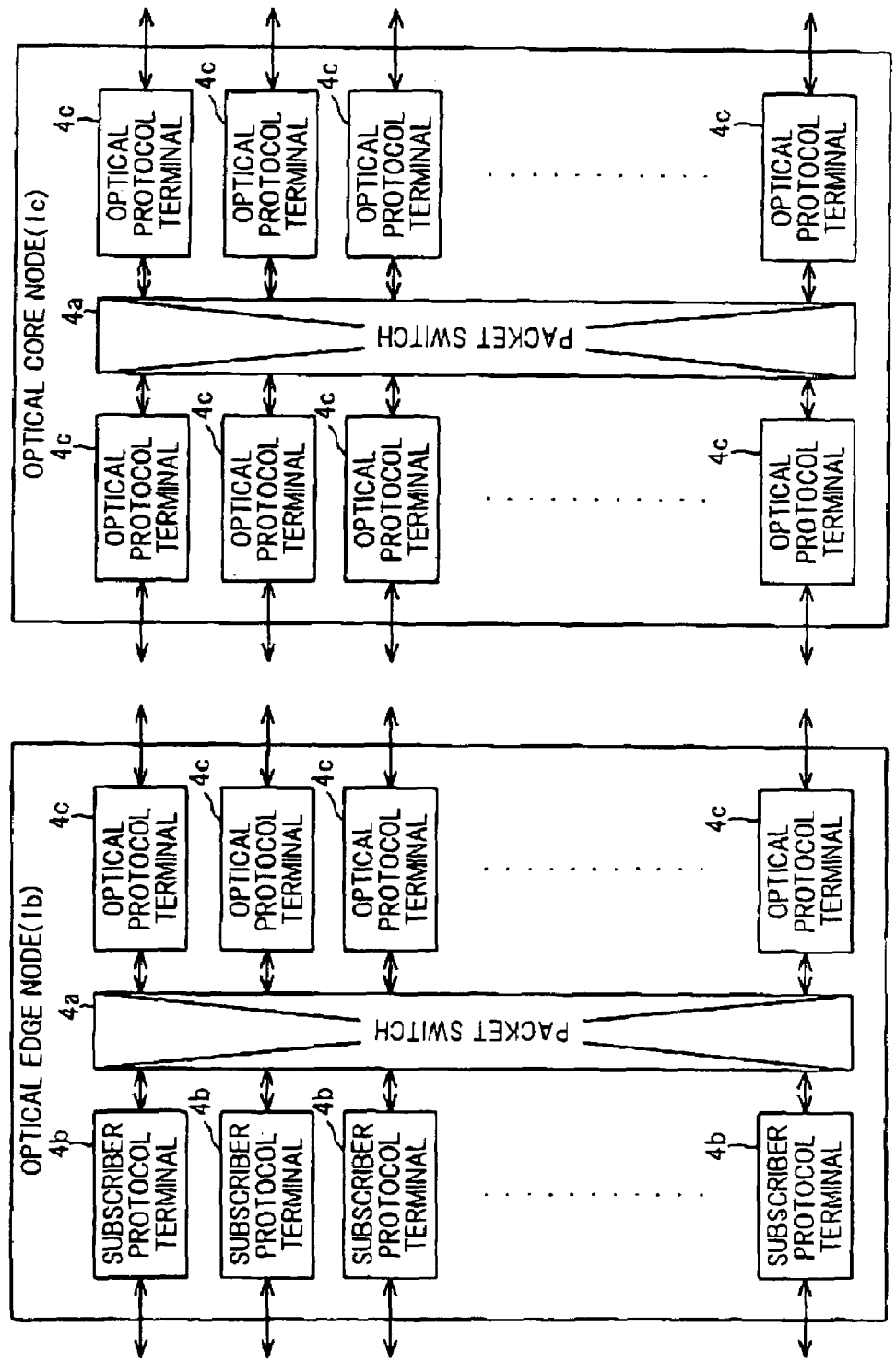
FIG. 9 is a block diagram showing the composition of optical edge node and core node used in the invention.

FIG. 9 is a block diagram showing a composition of optical edge/core node used in this invention. A optical edge node 1b in the embodiment is composed of subscriber protocol terminals 4b which include subscriber networks and function as a gateway, optical protocol terminals 4c which function as an interface with optical network, and a N×N packet switch 4a. Also, a optical core node 1c in the embodiment is composed of optical protocol terminals 4c and a N×N packet switch 4a.

Figure 10:
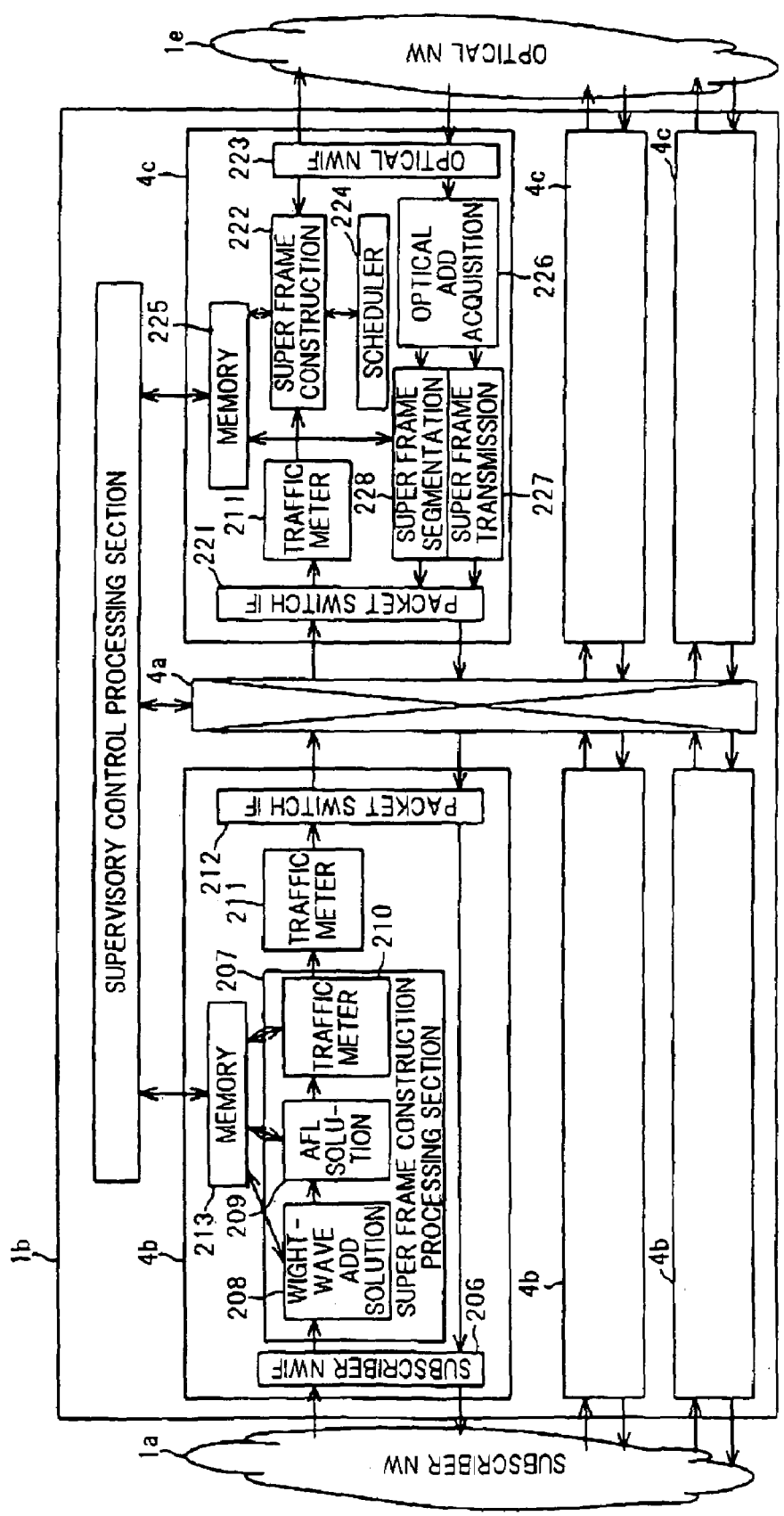
FIG. 10 is a block diagram showing a subscriber protocol terminal and a optical protocol terminal in FIG. 9.

FIG. 10 shows components of the subscriber protocol terminal 4b. The subscriber protocol terminal 4b is composed of a subscriber network (NW) interface (IF) 206 which conducts the transmit/receive of user packet from subscriber network 1a, a single frame constructing section 207 where user packet received from the subscriber network is encapsulated into a single frame as single optical adaptation frame, a memory 213 which stores destination optical router address used in the transfer operation in optical network 1e, aggregated flow label, in-network QOS identifier and payload into the header of optical adaptation frame, a traffic meter 211 which monitors the transfer capacity to each pair information of destination optical address and aggregated flow identifier (aggregated flow label: AFL), and a packet switch interface 212 which functions as the transmit/receive interface with the N×N packet switch 4a.

The single frame constructing section 207 of the subscriber protocol terminal 4b is composed of a optical address (Add) solution section 208 which solves destination address (e.g., IP address) in layer 3 of OSI (open system interface) reference model received from subscriber network 16 and optical node address 3c corresponding to each destination address, and AFL (aggregated flow label) solution section 209 which interprets IP flow to each solved optical node address and assigns newly aggregated flow identifier effective only in the network, and in-network class solution section 210 which determines in-network service class to assigned AFL.

The traffic meter 211 is equipped with means for monitoring such an excessive traffic inflow as to exceed a transferable capacity preset to each AFL from a supervisory control processing section 204, in case of exceeding the transferable capacity, conducting the feedback control to read-out section, and means for conducting polishing control to discard packet with concerned AFL or lowering the reading priority.

FIG. 10 also shows a composition of the optical protocol terminal 4c. In regard to the composition of the optical protocol terminal 4c, at first, the transfer processing from the packet switch (4a) to optical network interface (223) is explained. The optical protocol terminal 4c is composed of packet switch interface 221 which functions as the transmit/receive interface with the packet switch 4a, super frame constructing section 222 where a single frame received from subscriber network interface 206 is encapsulated into optical adaptation frame, scheduler 224 and traffic meter 211 which conduct the transfer control toward the optical network side even when IP packet more than a given length is not inserted, and the optical network interface 223 which conducts the transmit/receive of optical adaptation frame with the optical network 1e. Meanwhile, in the super frame constructing section 222, single frame received from optical NWIF channel card (not shown) may be further merged and encapsulated into super frame.

Now, in regard to the composition of the optical protocol terminal 4c, the transfer processing from the optical network interface 223 to the packet switch 221 is explained. The optical protocol terminal 4c is composed of the optical network interface 223 which functions as the transmit/ receive interface with the is optical network, optical address (ADD) acquisition section 226 which acquires destination optical router address from the header of optical adaptation frame received and then checks if it is the address of self-device, optical adaptation frame transfer section 227 which, when different from the address of self-device, reads a transfer wavelength path to destination optical address from a memory 225 and then transfers the optical adaptation frame to concerned switch port, and a super frame segmentation section 228 which has means for, when the destination optical address coincides with the address of self-device, tracing the payload length of the optical adaptation frame, thereby segmenting the optical adaptation frame, taking out the user packet, further conducting the address solution processing of the concerned packet header, transferring the user packet to the corresponding switch port.

In the above explanations, when the subscriber protocol terminal 4b can be provided with a sufficient memory capacity, by constructing single frame adding optical header to IP packet, and grouping the respective single frames while polishing the optical header in the optical protocol terminal 4c, super frame may be constructed.

However, in the above method, first, the resource (capacity) of packet switch is wasted, and second, depending on the amount of packet memory equipped for the subscriber protocol terminal, the packet FIFO is likely to break down (overflow). Therefore, in the device, optical node address 3e, aggregated flow label 3c and in-network service class 3d may be transferred to the switch side while being degenerated, and main signal packet system can be thus segregated from control information (in-device label) in such a form as to match the actual packet switch interface.

This can be yielded by only altering the table correlation in the memories 225, 213 given to the optical protocol terminal 4c and subscriber protocol terminal 4b, respectively. Since both optical edge node 1b and core node 1c are equipped with the supervisory control section 204 to function as an in-device server, the matching can be created by writing the correlation information to the memories of the interfaces 4b, 4c of each device without contradiction.

In detail, in the subscriber protocol terminal 4b, by the search of CAM (contents addressable memory) and the reading of SRAM (static RAM), optical node address 3e, aggregated flow label 3c and in-network service class 3d are degenerated as in-device aggregated flow number (AF number) to solve the in-device label, then placed into control information transfer field.

On the other hand, in the optical protocol terminal 4c, from the in-device AF number in the control information transfer field, optical node address 3e, aggregated flow label 3c and in-network service class 3d are solved by accessing to the memory, constructing the super frame.

Figure 11:
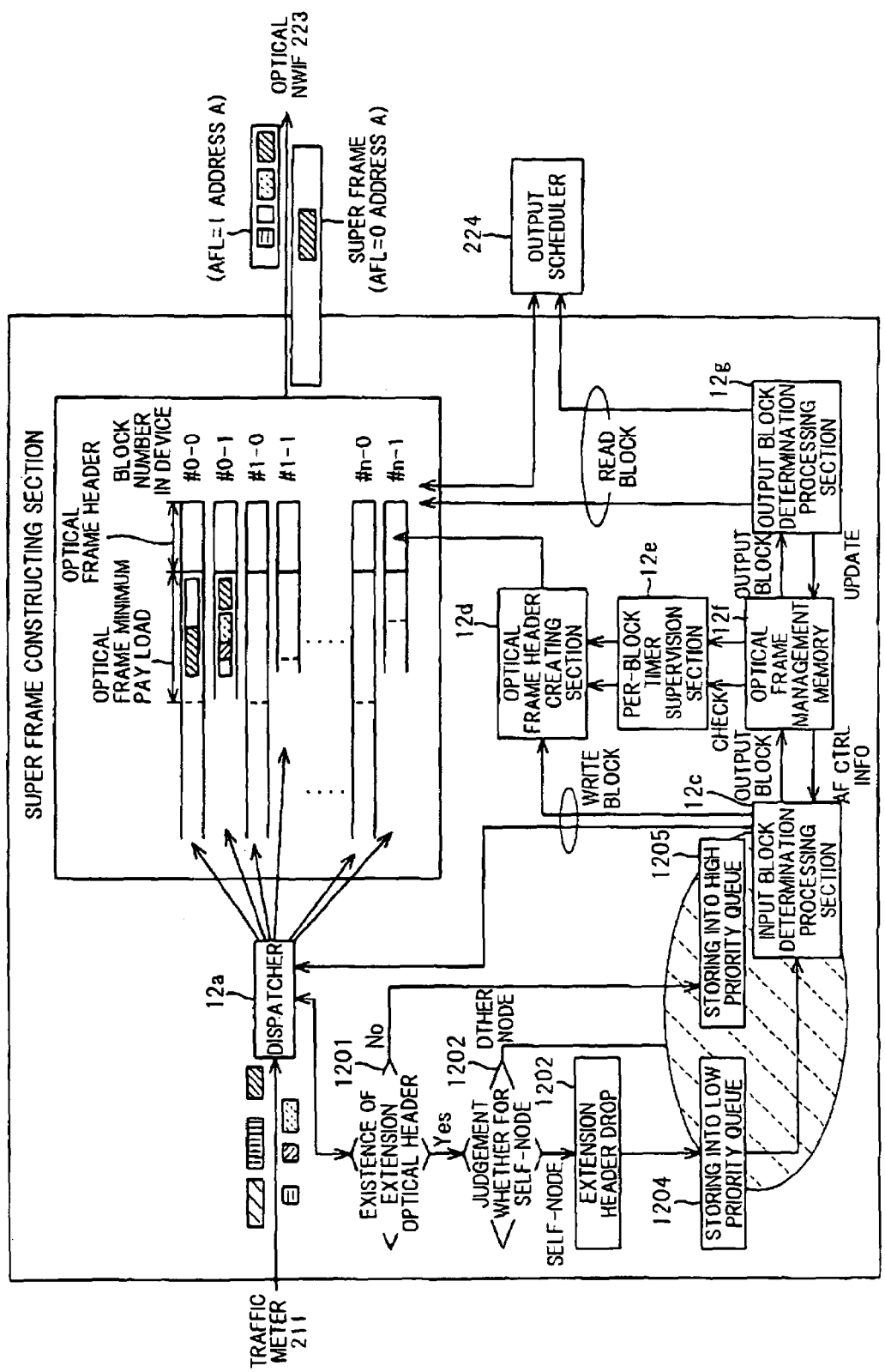
FIG. 11 is an illustration showing a super frame constructing section in the optical protocol terminal in FIG. 10.

FIG. 11 is a schematic diagram showing the super frame constructing section 222 of the optical protocol terminal 4c in FIG. 10. The super frame constructing section 222 is composed of dispatcher 12a which has a function of dispatching received optical frame into given super frame constructing memories, super frame constructing memory 12b provided with blocks (queues) assigned to each of destination optical node address, AFL and in-network service identifier stored in optical frame header, input block determination processing section 12c which operates with the dispatcher 12a, determining input block address of priority queue, generating write address, optical frame management memory 12f which controls the construction state of optical frame as to each in-device block, per-block timer supervision section 12e which timer-controls each in-device block, optical frame header creating section 12d which creates a header added to frame, and output block determination processing section 12g which generates read address (output block) for super frame constructing memory 12b to read super frame constructed or super frame timed out.

Referring to FIG. 11, an example of delay guarantee operation in the optical network of the invention is explained. In this example, as shown in FIG. 8, the originating edge node 9a determines that IP packet flow received from the subscriber network 1a is delay-oriented, through the via core nodes #2 (9c) and #4 (9e), transferring it to the destination edge node #D (9i).

Based on the node address of the destination edge node 9i, the extension optical header creating section creates the extension optical header 1 and extension optical header 2 which include the addresses of via core nodes #2 (9c), #4 (9e) in the destination address field. The extension optical header 1 and extension optical header 2 are shown in FIG. 8.

The created multiple extension optical headers, to which flags to indicate them are added, are multiplexed by the optical frame header creating section 12d, added in front of the optical header 3b including the actual destination address, transmitted to the optical network.

As shown in FIG. 8, in the via core node 9b, the dispatcher 12a detects the existence of extension optical header as to received packet.

When the extension optical header exists, it is forwarded to the processing at branch 1202. When no extension optical header exists at branch 1201, it is stored into high-priority queue and then the processing finishes.

At branch 1202, the existing extension optical header is further examined whether it is destined for self-node. When it is destined for self-node in the determination processing 1202, it is forwarded to processing 1203. When it is destined for the other node, it is stored into high-priority queue at 1205, and the processing finishes. At 1203, extension optical header where self-node destination is written is removed, and it is stored into low-priority queue 1204 to reconstruct the super frame.

As described above, in this invention, at the originating edge node, optical extension headers 1001, 1002 which includes single or multiple core node addresses are created. Also, since at core node, the routing of packet can be conducted according to the destination address of optical extension header, the transfer route can be freely changed by the policy of originating edge node, and in the routing up to the via core node, no waiting for super frame reconstruction occurs, therefore enabling the transit transfer.

Meanwhile, when the originating edge node 1a adds no extension optical header, it is transmitted through normal best-effort transfer route 1j set between the originating edge node to the destination edge node. So, in in-network transfer, delay-oriented class traffic can be segregated from best-effort type traffic.

In the first embodiment described earlier, only the number of via core nodes is designated and the merge node is not designated. So, when exceeding the number of hops designated, it is subject to the transit transfer even when not aggregated into super frame more than a given length. Thus, there is a problem that the super frame is not always constructed efficiently. However, in the second embodiment, the via core node can be designated by the originating edge node, therefore the super frame can be reconstructed at via core node with a big share ride effect of traffic. At the other core node, no waiting for super frame reconstruction occurs. So, the end-to-end delay can be reduced.

ADVANTAGES OF THE INVENTION

According to the invention, the QOS processing or transfer determination processing can be simplified. This is because optical adaptation (ADP) layer is added as an intermediate layer between IP layer as layer 3 and SONET layer as layer 2, and optical edge node (EN) terminates IP packets from the subscriber network, grouping the respective IP packets to construct a optical adaptation frame on the optical adaptation layer. Namely, the optical adaptation frame is aggregated by unit of destination network node (egress node for exiting to the destination user network from the network) or QOS (delay-oriented or best-effort).

Also, according to the invention, even in large-scale trunk network including an increased number of via nodes, the network QOS can be guaranteed without reducing the throughput in the network.

The first reason is that it is provided with means for mapping each IP flow to an aggregated flow label (AFL) to aggregate each destination router address or network QOS defined in the optical network at an edge node which has a slower interface than a core node located in the network and rules directly a subscriber network, and it constructs a optical ADP frame to which each IP packet is aggregated and which is handled as a transfer unit in the optical network.

The second reason is that it is provided with means for, even when n via core nodes exist between the originating edge node and destination edge node, defining nodes subject to the share ride waiting (reconstruction processing of super frame) to be m (m<n) So, the accumulated delay time can be reduced to (m/n)×Td.

The third reason is that by designating sequentially via core nodes with a big packet share-ride effect by the leading of the originating edge node, the frame can be transit-transferred without waiting the reconstruction of super frame until the designated via node.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A optical network, comprising:
    an optical adaptation layer whose order is higher than a synchronous optical network (SONET) layer and lower then an Internet Protocol (IP) layer;
    wherein said optical adaptation layer constructs an optical adaptation frame into which IP flows are aggregated at an edge node;
    said edge node sets the number of core nodes to conduct share ride waiting;
    the header of said optical adaptation frame includes time out limit (TOL) field, the value of said TOL field being set to be said number at said edge node;
    said value is decremented by one when the share ride is not done within a given time at said core node; and
    said optical adapt at ion frame is transit-transferred by a core node after a core node detecting that said value is zero.

2. A optical network, comprising:
    an optical adaptation layer whose order is higher than a synchronous optical network (SONET) layer and lower then an Internet Protocol (IP) layer;
    wherein said optical adaptation layer constructs an optical adaptation frame into which IP flows are aggregated at an edge node;
    said optical adaptation frame is provided with a header including an address of destination edge node added in front of the payload and provided with an extension header including an address of via core node in front of said header;
    said extension header includes an address of core node to go through at first on the top, which is followed by an address of core node in the order of going through; and
    said optical adaptation frame is transit-transferred at a core node with an address except said address included in said extension header.

3. A optical network, according to claim 2, wherein:
    said core node described in said extension header removes the self-node address from said extension header when the processing at the self-node finishes.

4. A optical network, according to claim 1, wherein:
    said edge node inputs the output of a subscriber protocol terminal as a gateway to contain a subscriber network to a optical protocol terminal through a packet switch,
    said core node inputs the output of said optical protocol terminal or the output of the optical protocol terminal of another core node to another optical protocol terminal through another packet switch,
    said subscriber protocol terminal constructs a single frame as said optical adaptation frame by unit of user packets from subscriber while adding an aggregated f low label (AFL), and conducts processing to discard said optical adaptation frame exceeding a transferable capacity set to each of said AFL or lowering the reading priority, and
    said optical protocol terminal constructs a super frame in which said single frame is merged by share ride, and sends out the super frame as said optical adaptation frame to another core node.

5. A optical network, according to claim 2, wherein:
    said edge node inputs the output of a subscriber protocol terminal as a gateway to contain a subscriber network to a optical protocol terminal through a packet switch,
    said core node inputs the output of said optical protocol terminal or the output of the optical protocol terminal of another core node to another optical protocol terminal through another packet switch,
    said subscriber protocol terminal constructs a single frame as said optical adaptation frame by unit of user packets from subscriber while adding an aggregated f low label (AFL), and conducts processing to discard said optical adaptation frame exceeding a transferable capacity set to each of said AFL or lowering the reading priority, and said optical protocol terminal constructs a super frame in which said single frame is merged by share ride, and sends out the super frame as said optical adaptation frame to another core node.

6. A optical network, according to claim 4, wherein:

said optical protocol terminal of said core node is provided with a dispatcher which dispatches received optical adaptation frame to corresponding memories according to each type of address, AFL and service, and said dispatcher issues a priority to process said optical adaptation frame based on the content of said extension header, constructs said super frame based on said priority, and sends out it to said another core node.

7. A optical network, according to claim 5, wherein:

said optical protocol terminal of said core node is provided with a dispatcher which dispatches received optical adaptation frame to corresponding memories according to each type of address, AFL and service, and said dispatcher issues a priority to process said optical adaptation frame based on the content of said extension header, constructs said super frame based on said priority, and sends out it to said another core node.

* * * * *